(12) United States Patent
Somers

(10) Patent No.: US 6,197,887 B1
(45) Date of Patent: *Mar. 6, 2001

(54) COMPOSITIONS HAVING PARTICULAR UTILITY AS STRETCH WRAP CLING FILM

(75) Inventor: Marc Stacey Somers, Longview, TX (US)

(73) Assignee: Eastman Chemical Company, Kingsport, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/145,452

(22) Filed: Sep. 2, 1998

Related U.S. Application Data

(60) Provisional application No. 60/058,761, filed on Sep. 12, 1997.

(51) Int. Cl.$^7$ ..................................................... C08L 23/16
(52) U.S. Cl. .......................... 525/240; 526/348; 526/352; 526/351
(58) Field of Search ..................................... 526/348, 352, 526/351; 525/240

(56) References Cited

U.S. PATENT DOCUMENTS

| | | |
|---|---|---|
| 3,700,753 * | 10/1972 | Terada et al. ..................... 260/876 B |
| 4,123,417 | 10/1978 | Finberg et al. . |
| 4,275,119 | 6/1981 | Weiner . |
| 4,291,092 | 9/1981 | Weiner . |
| 4,339,496 | 7/1982 | Weiner . |
| 4,339,498 | 7/1982 | Weiner . |
| 4,340,640 | 7/1982 | Weiner . |
| 4,340,641 | 7/1982 | Weiner . |
| 4,348,455 | 9/1982 | Clayton . |
| 4,367,256 | 1/1983 | Biel . |
| 4,399,180 | 8/1983 | Briggs et al. . |
| 4,418,114 | 11/1983 | Briggs et al. . |
| 4,430,457 | 2/1984 | Dobreski . |
| 4,536,549 | 8/1985 | Hattori et al. . |
| 4,542,188 | 9/1985 | van der Heijden . |
| 4,588,650 | 5/1986 | Mientus et al. . |
| 4,597,920 | 7/1986 | Golike . |
| 4,624,991 | 11/1986 | Haas . |
| 4,692,496 | 9/1987 | Bahl et al. . |
| 4,822,855 | 4/1989 | Kobayashi et al. . |
| 4,851,478 | 7/1989 | Su . |
| 4,861,834 | 8/1989 | Audureau et al. . |
| 4,871,813 | 10/1989 | Senez . |
| 4,929,681 | 5/1990 | Bahl et al. . |
| 4,985,498 | 1/1991 | Shirodkar . |
| 5,041,491 | 8/1991 | Turke et al. . |
| 5,047,468 | 9/1991 | Lee et al. . |
| 5,051,481 | 9/1991 | Taka et al. . |
| 5,085,927 | 2/1992 | Dohrer . |
| 5,087,667 | 2/1992 | Hwo . |
| 5,110,870 | 5/1992 | Fujii et al. . |
| 5,114,763 | 5/1992 | Brant et al. . |
| 5,126,398 | 6/1992 | Lee et al. . |
| 5,126,408 | 6/1992 | Rifi . |
| 5,147,936 | 9/1992 | Peszkin et al. . |
| 5,212,246 | 5/1993 | Ogale . |
| 5,218,046 | 6/1993 | Audureau et al. . |
| 5,254,617 | 10/1993 | Isoue et al. . |
| 5,262,228 | 11/1993 | Kobyama et al. . |
| 5,328,734 | 7/1994 | Morese-Seguela et al. . |
| 5,334,428 | 8/1994 | Dobreski et al. . |
| 5,344,714 | 9/1994 | Su . |
| 5,358,792 | 10/1994 | Mehta . |
| 5,374,677 | 12/1994 | Nishio et al. . |
| 5,378,764 | 1/1995 | Benham et al. . |
| 5,397,843 | 3/1995 | Lakshmanan et al. . |
| 5,407,732 | 4/1995 | Dokurno . |
| 5,455,303 | 10/1995 | Panagopoulos, Jr. et al. . |
| 5,464,905 | 11/1995 | Tsutsui et al. . |
| 5,478,890 | 12/1995 | Shinozaki et al. . |
| 5,489,478 | 2/1996 | Audry et al. . |
| 5,561,195 | 10/1996 | Govoni et al. . |
| 5,569,693 | 10/1996 | Doshi et al. . |
| 5,631,069 | 5/1997 | Wooster . |
| 5,635,262 | 6/1997 | Best . |
| 5,654,051 | 8/1997 | Andersson et al. . |
| 5,656,374 | 8/1997 | Marzola et al. . |

FOREIGN PATENT DOCUMENTS 1 109 512    5/1984    (EP) .

OTHER PUBLICATIONS

*Research Disclosure*, Jun. 1992, 33875, Amorphous Polyolefins as Tack Additives for Polyethylene Blown and Cast Films.

* cited by examiner

Primary Examiner—David W. Wu
Assistant Examiner—Ling-Siu Choi
(74) Attorney, Agent, or Firm—Jonathan D. Wood; Harry J. Gwinnell

(57) ABSTRACT

A novel composition is disclosed comprising about 85 to about 99 weight percent based on the composition of a polymeric ethylenic containing component having a density no greater than 0.94 g/cc, and about 1 to about 15 weight percent based on the composition, of a propylene polymer comprising 0 to less than about 1 weight percent based on the polymer, of olefin comonomer units and from about greater than 99 to 100 weight percent propylene, based on the polymer, the propylene polymer having a viscosity of about 1 to about 2,000 mPa.s at 190° C. and a needle penetration of about 5 to about 50 dmm at 23° C. Also disclosed are films produced from the composition, both blown and cast, and both monolayer and multilayer. Also disclosed are processes for stretch wrapping and forming blown film.

22 Claims, No Drawings

COMPOSITIONS HAVING PARTICULAR UTILITY AS STRETCH WRAP CLING FILM

CROSS REFERENCE TO RELATED APPLICATIONS

This application claims priority under 35 U.S.C. Section 119(e) to U.S. Provisional application Ser. No. 60/058,761, filed Sep. 12, 1997. The present application is related to co-pending U.S. application Ser. Nos. 09/104,726, 09/104,726, 09/145,451, and 09/145,684.

FIELD OF THE INVENTION

The present invention relates to compositions having particular utility in the production of film. More particularly, the present invention relates to compositions comprising a blend of an ethylene polymer and a very low viscosity propylene polymer, having particular utility in the production of film, especially stretch wrap cling film.

BACKGROUND OF THE INVENTION

Linear low density polyethylene ("LLDPE") has been found useful as the film-forming component of blown stretch wrap films since it is especially strong. However, a cling additive must be blended with the LLDPE prior to film formation since LLDPE does not exhibit a high level of cling. Stretch wrap film loses peel cling when stretched. It is important that blown stretch wrap film have an adequate amount of cling when stretched to lengths of at least 200 percent elongation, for typical stretch wrapping processes.

Amorphous polyolefins having a viscosity greater than about 2,000 mPa.s at 190° C. have been found to be useful as LLDPE "cast" stretch film tackifiers for providing film cling, but not useful as LLDPE "blown" stretch film tackifiers. The LLDPE film containing the amorphous polyolefins does not have adequate peel strength at 200 percent elongation.

U.S. Pat. No. 4,430,457 (Dobreski) discloses a cling additive for ethylene vinyl acetate ("EVA"), low density polyethylene ("LDPE"), or LLDPE film compositions comprising a low viscosity amorphous propylene-ethylene copolymer having about 1 to about 7 weight percent ethylene units. The particular propylene copolymer disclosed in the example in that patent is POLYPOL 19, produced and sold by Crowley Chemical Company. POLYPOL 19 copolymer has a viscosity of 50 to 120 mPa.s at 190° C., a ring and ball softening point (RBSP) of 77 to 99° C., and a cone penetration of 65 to 90 dmm at 21° C. (needle penetration estimated by applicant to be approximately 130 to 180 dmm at 21° C.) according to Crowley Chemical Company, Inc. Technical Bulletin (Jan. 10, 1994, POLYPOL 19). Dobreski discloses that blown film formed from those compositions have adequate peel cling when unstretched.

SUMMARY OF THE INVENTION

The present invention relates to a composition of matter comprising about 85 to about 99 weight percent based on the composition of a component selected from the group consisting of low density polyethylene, linear low density polyethylene, ethylene vinyl acetate copolymer, and mixtures thereof, and about 1 to about 15 weight percent, based on the composition, of a propylene polymer comprising 0 to less than about 1 weight percent based on the polymer, of an olefin comonomer unit having 2 to 10 carbon atoms, wherein said propylene polymer has a Brookfield Thermosel viscosity of about 1 to about 2,000 mPa.s at 190° C. and a needle penetration of about 5 to about 50 dmm, at 23° C.

DETAILED DESCRIPTION OF THE INVENTION

The applicant has unexpectedly found that, within the particular viscosity range of about 1 to about 2,000 mPa.s at 190° C., polypropylene homopolymer, and polypropylene copolymer comprising 0 to less than about 1 weight percent olefin comonomer, is a very good cling additive in polyethylene-based film compositions. It was surprising to find that the polypropylene of the present invention could provide cling properties to LLDPE, LDPE, and EVA since polypropylene homopolymer and copolymers having viscosities greater than about 2,000 mPa.s, at 190° C. do not generally provide cling in polyethylene-based blown film.

An unexpected benefit of the composition of the present invention is the improved packagability and processability. The composition can easily be formed into individual pellets that can be stored at room temperature for later use.

The composition of the present invention comprises about 85 to about 99 weight percent based on the total composition, of a component selected from the group of ethylene polymers consisting of low density polyethylene ("LDPE"), linear low density polyethylene ("LLDPE"), ethylene vinyl acetate ("EVA"), and mixtures thereof, and about 1 to about 15 weight percent based on the composition, of a propylene polymer comprising from greater than 99 percent to 100 weight percent based on the polymer, of propylene units and 0 to less than about 1 weight percent based on the polymer, olefin comonomer units having 2 to 10 carbon atoms. The propylene polymer has a Brookfield Thermosel viscosity of about 1 to about 2,000 mPa.s at 190° C. and a needle penetration of about 5 to about 50 dmm, at 23° C.

The ethylene containing polymeric component is a homopolymer of ethylene or a copolymer of ethylene with a comonomer copolymerizable therewith. More particularly, the ethylene containing polymeric component is selected from a hompolymer of ethylene, an ethylene alpha olefin copolymer, an ethylene vinyl acetate copolymer, and mixtures thereof, wherein the ethylene containing polymeric component has a density no greater than 0.94 g/cc. The ethylene containing polymeric component preferably has a density of from about 0.88 to about 0.93 g/cc, and more preferably, from about 0.89 to about 0.92 g/cc.

The alpha olefin comonomer of the ethylene alpha olefin copolymer preferably has from 3 to 20 carbon atoms per molecule and is present in an amount of from about 2 to about 20 weight percent based on the ethylene alpha olefin copolymer. Examples of the alpha olefin copolymer include 1-butene, 1-pentene, 4-methyl-1-pentene, 1-hexene, 1-octene, 1-nonene, 1-decene, 1-dodecene, a terpolymer of ethylene, a terpolymer of 1-butene, a terpolymer of 1-hexene, and mixtures and derivatives thereof. In a preferred embodiment, the alpha olefin is selected from 1-butene, 1-hexene and 1-octene.

The ethylene containing polymeric component may be prepared readily by any conventional technique known in the art.

Stretch wrap film made from blown film processes is generally stronger than film made from casting. Since LDPE and EVA films are not as strong as LLDPE films, the preferred ethylenic component of the present invention is LLDPE. LLDPE has excellent elongation, good tear resistance, good tensile strength, and good puncture resistance. LLDPE is a copolymer of ethylene and an alpha olefin, with density from about 0.88 g/cm$^3$ to about 0.94 g/cm$^3$ and a melt index of about 0.4 to about 8 g/10 min. The LLDPE used is more preferably an ethylene-octene or ethylene-hexene LLDPE copolymer. The presence of up to about 20 weight percent LDPE, along with the LLDPE, improves processability, bubble stability, and optical properties. A minor amount of other polyolefins may be present in the ethylenic component.

The ethylene containing polymeric component, comprises about 85 to about 99 weight percent of the present composition and the propylene polymer comprises about 1 to about 15 weight percent. More preferably, the composition comprises about 90 to about 99 weight percent ethylenic component, and the propylene polymer comprises from about 1 to about 10 weight percent, based on the total composition.

The propylene polymer of the composition is a very low molecular weight polypropylene homopolymer or polypropylene copolymer having less than about 1 weight percent C2 to C10 alpha olefin comonomer unit content. The propylene polymer preferably has less than about 0.5 weight percent comonomer content. The homopolymer is still more preferred. The modifying alpha olefin comonomer units are preferably ethylene units.

The propylene polymer of the present invention is partially crystalline. That is, the propylene polymer has a measurable amount of crystallinity, as determined using a hexane extraction method, such as ASTM D5227. The propylene polymer more preferably has at least 1 weight percent crystalline content. The usefulness of polypropylene having the presence of a measurable amount of crystallinity is a further unexpected aspect of the present invention since previously known polypropylene tack additives generally have been amorphous.

The low molecular weight of the propylene polymer of the present invention is critical. The low molecular weight is evidenced by the melt viscosity values at 190° C., determined by the Brookfield Thermosel method. This very low viscosity range of the propylene polymer is from about 1 to about 2,000 mPa.s, at 190° C. The viscosity is preferably from about 1 to about 1,500 mPa.s, at 190°, with about 1 to about 800 mPa.s, at 190° C. being more preferred.

The propylene polymer of the present invention is relatively hard for a cling additive. The propylene polymer has a needle penetration of about 5 to about 50 dmm, determined by modified ASTM (test method modified to 23° C., instead of 25° C.). The propylene polymer preferably has a needle penetration of about 5 to about 40 dmm at 23° C., with about 5 to about 30 dmm at 23° C. being more preferable.

The propylene polymer component of the composition utilized herein may be produced by a process disclosed in Canadian Patent 1,296,484, entitled "Process for the Direct Synthesis of Highly Amorphous Propylene Homopolymers and Propylene—Ethylene Copolymers." Some of the propylene copolymer components within the scope of the present invention may also be purchased from Eastman Chemical Company, Kingsport, Tenn. under the Eastman Chemical Company Trademark, EASTOFLEX.

The exact amounts of the ethylene containing polymeric component and the propylene polymer component of the compositions herein are determined by the application for which film produced therefrom is to be employed. Variation of the amounts of each component is within the scope of one skilled in the art.

For many purposes, it may be desirable to incorporate other conventional additives with the compositions of the present invention. For example, there may be added antioxidants, heat and light stabilizers, dyes, antistatic agents, preservatives, processing aids, pigments, flame retardants, and the like.

The compositions of the ethylene containing polymeric component defined hereinabove and the propylene polymer defined hereinabove are readily prepared by any method known in the art. For example, the component of the composition may be blended together by melt extrusion or may be admixed together on a conventional mixing machine such as an extruder or a continuous mixer.

The composition of the present invention has a good peel cling strength for use in forming stretch wrap film. It is now commonplace for stretch wrap film to be elongated to 200 percent and higher, during a stretch wrapping process. Peel cling strength generally decreases with more elongation. Therefore, it is important to determine that the peel cling strength of a film be adequate in an elongated state, instead of being measured only when unstretched, as has been past practice. At 200 percent elongation, film produced from the composition of the present invention preferably has a peel cling strength of about 100 to about 500 g/2.54 cm, more preferably about 100 to about 400 g/2.54 cm, with about 100 to about 300 g/2.54 cm being still more preferable, determined using ASTM Method D5458-95 "Standard Test Method for Peel Cling of Stretch Wrap Film".

The composition of the present invention can be formed into stretch wrap film using any technique known in the art such as a cast method or blown film method. The present invention includes a blown film process wherein an extruder having an annular die is used for extruding the composition of the present invention. Air is blown in through the extruder die to form a bubble of the present polymer blend having a blow-up ratio of 1 to 3.5 times the die diameter. After a cooling air stream cures the film, the film is wound onto rolls. More particularly, a composition as defined hereinabove is introduced into the feed hopper of an extruder that is water-cooled, and resistance heated. The films were produced using an annular die having a die gap of about 2.24 mm having a dual orifice nonrotating, nonadjustable air ring. The film is extruded through the die into a film that is cooled by blowing air onto the surface of the film in a blowing manner. The film is drawn from the die typically forming a cylindrical film that is cooled, collapsed, optionally slit, and wound to form a roll of film. In preparing cast film, any of the well known cast film forming procedures may be utilized.

The present invention further includes a film of the composition of the present invention. The preferable film is a blown stretch wrap cling film. The film generally has a higher impact strength and a higher gloss than the neat LLDPE. The film made from the composition of the present invention generally also has a high speed unwinding noise not greater than the unwinding noise of neat LLDPE. This is important in light of the OSHA noise workplace restrictions. The present invention also includes articles of manufacture comprising a film of the composition of the present invention. Such articles include monolayer films and multilayer films in which the film of the composition of the present invention is at least one layer.

The present invention further includes a process for stretch wrapping, using a film of the composition of the present invention. The process comprises wrapping the film of the present invention about the girth of a unitized plurality of goods so that the film is in a stretched condition and the end region of the film is attached to a previous area of film by cling force.

The invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the analytical properties of the compositions herein and in evaluating the physical properties of the films of the examples.

Peel cling values were obtained in accordance with ASTM D5458-95 entitled "Standard Test Method for Peel Cling of Stretch Wrap Film."

Noise level, in decibels, dB, was measured by unwinding the film rolls at speeds of about 20 m/min. to about 70 m/minute. A digital sound meter was used to measure the level of sound generated by the film roll while unwinding.
Haze—ASTM D1003
Dart—ASTM D1709A
Gloss—ASTM D2457
Tear—ASTM D1922
Puncture—ASTM D4649
Viscosity—ASTM D3236 (at 190° C.)
Needle Penetration—ASTM (at 23° C.)
Melt index—ASTM D1238 (at 190° C.)
Density—ASTM D4888

Example 1

The propylene homopolymers in Table 1A were compounded into a 0.9 g/10 min. melt index, 0.920 g/cm$^3$ density ethylene-hexene copolymer at a level of 4% by weight and formed into 0.0008 inch (0.020 mm) thick blown film. The films were made with a blow-up ratio of about 2.4:1 at about 100 feet/minute (30.5 m/minute). Peel cling values were measured on the films, both unstretched and at about 200% elongation. The elongated peel cling values more accurately represent the conditions encountered during pallet wrapping, where the film is stretched by pre-stretch rollers or by the pallet load itself. Peel cling values listed in Table 1B were measured 2 weeks after the film was produced.

TABLE 1A

| Propylene Polymer | Visc., mPa.s at 190° C. | Needle Pen. dmm |
|---|---|---|
| 1A | 900 | 20 |
| 1B | 525 | 20 |
| 1C | 373 | 21 |
| 1D | 203 | 24 |

TABLE 1B

| Propylene Polymer | Unelongated Peel Cling, g/2.54 cm | Elongated Peel Cling, g/2.54 cm |
|---|---|---|
| 1A | 437 | 84 |
| 1B | 440 | 147 |
| 1C | 380 | 154 |
| 1D | 485 | 162 |

The applicant has defined commercially adequate peel cling as being at least about 100 g/2/54 cm, for purposes of the present application. The peel cling data above illustrates that the polypropylene samples ranging in viscosity from 203–525 mPa.s at 190° C. yield sufficient elongated peel cling for commercial use. Film using Sample 1A, EASTOFLEX-P1010 produced and sold by Eastman Chemical Company, had elongated peel cling lower than 100 g/2.54 cm making it not an ideal candidate commercially as an LLDPE blown film tack additive, but useful for other applications not requiring such a high level of elongated peel cling.

Example 2

The following commercial propylene polymers were evaluated as monolayer blown film tack additives in an LLDPE ethylene-octene copolymer. The octene-LLDPE had a density of 0.916 g/cm$^3$ and a melt index of 2.3 g/10 min. This type of LLDPE is normally used for cast film applications, but was evaluated as a blown film material to determine if a lower density, higher melt index product possessed commercially adequate peel cling when made into blown film. The 0.001 inch (0.025 mm) thick films were made using a blow-up ratio of about 2.0:1 at about 80 feet/minute (24.4 m/minute). The following commercial polypropylene APOs, both available from Eastman Chemical Company, were evaluated in the above LLDPE polymer at 5 percent by weight. The properties listed in Table 2 are typical properties for these commercial APO products. Table 2 also contains the peel cling data measured 2 weeks after the film was produced.

TABLE 2

| Commercial APO | P1023 | E1060 | None |
|---|---|---|---|
| Visc., mPa.s at 190° C. | 2,250 | 6,000 | — |
| Wt. % Ethylene | — | 13.0 | — |
| Needle Pen. dmm | 20 | 40 | — |
| Unelongated Peel Cling, g/2.54 cm | 240 | 247 | 0 |
| Elongated Peel Cling, g/2.54 cm | 0 | 0 | 0 |

The data above indicate that the addition of either APO product (propylene homopolymer or propylene-ethylene copolymer) increases the unelongated peel cling of the blown film. However, there was no measurable peel cling detected when the films were elongated. This indicates that neat LLDPEs do not have sufficient inherent peel cling to be used in blown stretch film applications where high levels of peel cling are required. It is further apparent that APOs with viscosities of greater than about 2,000 mPa.s at 190° C. do not provide sufficient elongated peel cling in blown LLDPE film when added at about 5% by weight to make them useful as a stretch wrap film tack additive, where commercial usage requires a high level of cling. From Table 2, it is noted that no increase in peel cling, when elongated, was obtained, compared to the neat LLDPE, when the two APO products which were added to the LLDPE did not conform with the propylene polymers of the present invention.

Example 3

Example 3 illustrates that the composition of the present invention can also be used to form multi-layer blown A/B/A type film. EASTOFLEX E1003 propylene copolymer product produced and sold by Eastman Chemical Company, and a propylene polymer, 3A, of the composition of the present invention were evaluated as multi-layer blown film additives in a series of LLDPE ethylene-hexene copolymers utilized as the skin layers of the multi-layer films. The skin layers ranged in density from about 0.906 g/cm$^3$ to about 0.920 g/cm$^3$, and in melt index from about 0.5 g/10 min. to about 2.0 g/10 min. The 0.001 inch (0.025 mm) thick films were made with a blow-up ratio of about 2.4:1 at about 60 feet/minute (18.3 m/minute).

The multi-layer films were of the A/B/A type. The core layer (B layer) comprised 80% by weight of the entire film. In all of the multi-layer films, the core layer (B layer) was a 0.9 g/10 min. melt index, 0.920 g/cm$^3$ density ethylene-hexene copolymer. The outside (skin) layers (A layers) each comprised 10% by weight of the multi-layer film and were ethylene-hexene copolymers, as described hereinabove.

In evaluating the effectiveness of the propylene polymers of the present invention in five (5) varied multi-layers films there was utilized sample 3A, described in Table 3, at levels of about 4% and about 8% by weight in the skin layers. In all instances, the control was a multi-layer film with no propylene polymer additive. In one instance, there was a further control, namely Eastman Chemical Company's EASTOFLEX E1003 propylene copolymer, described also in Table 3, which is not a propylene product of the present invention.

TABLE 3

| Propylene Polymer Additive | Visc., mPa.s at 190° C. | Wt. % Ethylene | Needle Pen. dmm |
|---|---|---|---|
| EASTOFLEX E1003 | 250 | 18.0 | 100 |
| 3A | 212 | — | approximately 24 |

In the following Tables 4–8, there are provided the peel cling data for the various multi-layer films, measured 2 weeks after the films were produced.

TABLE 4

Skin Layer = About 0.9 g/10 min.
Melt Index and About 0.920 g/cm$^3$ Density

| Propylene Polymer Additive | Unelongated Peel Cling, g/2.54 cm | Elongated Peel Cling, g/2.54 cm |
|---|---|---|
| None | 0 | 0 |
| 4% Sample 3A | 202 | 0 |
| 8% Sample 3A | 243 | 0 |

TABLE 5

Skin Layer = About 0.9 g/10 min.
Melt Index and About 0.918 g/cm$^3$ Density

| Propylene Polymer Additive | Unelongated Peel Cling, g/2.54 cm | Elongated Peel Cling, g/2.54 cm |
|---|---|---|
| None | 173 | 0 |
| 4% Sample 3A | 373 | 0 |
| 8% Sample 3A | 500 | 67 |

TABLE 6

Skin Layer = About 0.9 g/10 min.
Melt Index and About 0.910 g/cm$^3$ Density

| Propylene Polymer | Unelongated Peel Cling, g/2.54 cm | Elongated Peel Cling, g/2.54 cm |
|---|---|---|
| None | 172 | 0 |
| 4% E1003 | 481 | 83 |
| 8% E1003 | 695 | 130 |
| 4% Sample 3A | 565 | 65 |
| 8% Sample 3A | 745 | 153 |

TABLE 7

Skin layer = About 2.0 g/10 min.
Melt Index and About 0.910 g/cm$^3$ Density

| Propylene Polymer | Unelongated Peel Cling, g/2.54 cm | Elongated Peel Cling, g/2.54 cm |
|---|---|---|
| None | 187 | 0 |
| 4% Sample 3A | 688 | 0 |
| 8% Sample 3A | 774 | 107 |

TABLE 8

Skin Layer = About 0.5 g/10 min.
Melt Index and About 0.906 g/cm$^3$ Density

| Propylene Polymer | Unelongated Peel Cling, g/2.54 cm | Elongated Peel Cling, g/2.54 cm |
|---|---|---|
| None | 0 | 0 |
| 4% Sample 3A | 144 | 0 |
| 8% Sample 3A | 445 | 187 |

In general, the data in Tables 4–8 indicate that the incorporation of a propylene polymer of the present invention provides increased cling values, as compared to neat polyethylene skin layers. Moreover, in Table 6, it is shown that use of the propylene polymer of the present invention provides cling values of approximately the same level as achieved using as a control, EASTOFLEX E1003 polymer, which has a higher ethylene content and a higher needle penetration value.

Example 4

This example illustrates the use of the composition of the present invention in a multilayer A/B/A type film wherein the propylene polymer is used in the core layer, as well as in the skin layers. The hexene-LLDPE skin layers ranged in density from about 0.906 g/cm$^3$ to about 0.920 g/cm$^3$ and in melt index from about 0.5 g/10 min. to about 2.0 g/10 min. The 0.001 inch (0.025 mm) thick films were made with a blow-up ratio of about 2.4:1 at about 60 feet/minute (18.3 m/minute). The multilayer AIB/A films had a core layer comprising 80% by weight of the entire film. The core layer in all films was a 0.9 g/10 min. melt index, 0.920 g/cm$^3$ density ethylene-hexene copolymer. The outside (skin) layers were each 10% by weight of the film structure and were made from ethylene-hexene copolymers. The following propylene polymers in Table 9 were evaluated in these films at a level of about 8% by weight in the outside skin film layers and also in the core layer at a level of zero or about 1% by weight:

TABLE 9

| Propylene Polymer | Visc., mPa.s at 190° C. | Wt. % Ethylene | Needle Pen. dmm |
|---|---|---|---|
| EASTOFLEX E1003 | 250 | 18.0 | 100 |
| 3A | 212 | — | approximately 24 |

Tables 10–14 contain the peel cling data for the above described multi-layer films, measured 2 weeks after the films were produced. The data in Tables 10–14 compare the effects on peel cling of adding propylene polymer to the core layer of the multi-layer film at a level of about 1% by weight. In all instances, the propylene polymer utilized in the core layer of the multi-layer film was the same as the propylene polymer utilized in the skin layers.

TABLE 10

Skin Layer = About 0.9 g/10 min.
Melt Index and About 0.920 g/cm³ Density

| Propylene Polymer | Unelongated Peel Cling, g/2.54 cm | Elongated Peel Cling, g/2.54 cm |
|---|---|---|
| 3A Not in Core | 294 | 0 |
| 3A In Core at 1% | 355 | 0 |

TABLE 11

Skin Layer = About 0.9 g/10 min.
Melt Index and About 0.918 g/cm³ Density

| Propylene Polymer | Unelongated Peel Cling, g/2.54 cm | Elongated Peel Cling, g/2.54 cm |
|---|---|---|
| 3A Not in Core | 509 | 71 |
| 3A In Core at 1% | 500 | 67 |

TABLE 12

Skin Layer = About 0.9 g/10 min.
Melt Index and About 0.910 g/cm³ Density

| Propylene Polymer | Unelongated Peel Cling, g/2.54 cm | Elongated Peel Cling, g/2.54 cm |
|---|---|---|
| E1003 Not in Core | 695 | 130 |
| E1003 In Core at 1% | 708 | 226 |
| 3A Not in Core | 745 | 153 |
| 3A In Core at 1% | 711 | 202 |

TABLE 13

Skin Layer = About 2.0 g/10 min.
Melt Index and About 0.910 g/cm³ Density

| Propylene Polymer | Unelongated Peel Cling, g/2.54 cm | Elongated Peel Cling, g/2.54 cm |
|---|---|---|
| 3A Not in Core | 774 | 107 |
| 3A In Core at 1% | 800 | 129 |

TABLE 14

Skin Layer = About 0.5 g/10 min.
Melt Index and About 0.906 g/cm³ Density

| Propylene Polymer | Unelongated Peel Cling, g/2.54 cm | Elongated Peel Cling, g/2.54 cm |
|---|---|---|
| 3A Not in Core | 445 | 187 |
| 3A In Core at 1% | 642 | 274 |

From the data in Tables 10–14, it appears that the incorporation of propylene polymer of the present invention into the core as well as into the skin layers provides equal or better cling values, as compared to using propylene polymer in the skin layers only.

Example 5

This example illustrates several useful levels of propylene polymer in the compositions of the present invention. Sample 1D propylene homopolymer was evaluated in a LLDPE ethylene-hexene copolymer. The hexene-LLDPE had a density of about 0.920 g/cm³ and a melt index of about 0.9 g/10 min. The 0.0008 inch (0.020 mm) thick films were made using a blow-up ratio of about 2.4:1 at a rate of about 100 feet/min. (30.5 m/min). Sample 1D was evaluated at levels of about 4%, 6% and 8% by weight. The properties of Sample 1D are shown above in Table 1A and are described as having a melt viscosity of about 203 mPa.s at 190° C. and a needle penetration hardness value of about 24 dmm. Table 15 contains the peel cling data for the above described films measured 2 weeks after the films were produced.

TABLE 15

| % Sample 1D in film composition | Unelongated Peel Cling, g/2.54 cm | Elongated Peel Cling, g/2.54 cm |
|---|---|---|
| 0 | 0 | 0 |
| 4 | 277 | 104 |
| 6 | 397 | 219 |
| 8 | 515 | 372 |

The data above indicate that the greater the amount of propylene homopolymer in the film composition, the higher the resulting peel cling values. In essence, the amount of peel cling can be tailored to meet individual needs.

Example 6
(Comparative to Example 5)

EASTOFLEX E1200 amorphous polyolefin having typical properties described in Table 16, and available from Eastman Chemical Company, was evaluated in a monolayer blown film prepared from the same type of LLDPE ethylene-hexene copolymer as in Example 5. The hexene-LLDPE had a density of about 0.920 g/cm³ and a melt index of about 0.9 g/10 min. The 0.0008 inch (0.020 mm) thick films were made using a blow-up ratio of about 2.4:1 at a rate of about 100 feet/min. (30.5 m/min.). The E1200 propylene polymer was evaluated at a level of about 4% by weight. Table 17 contains the peel cling data for the above described films, measured 2 weeks after the film was produced.

TABLE 16

| Propylene Polymer | Visc., mPa.s at 190° C. | Wt. % Ethylene | Needle Pen. dmm |
|---|---|---|---|
| EASTOFLEX E1200 | 20,000 | 15.0 | 35 |

TABLE 17

| Propylene Polymer | Unelongated Peel Cling, g/2.54 cm | Elongated Peel Cling, g/2.54 cm |
|---|---|---|
| None | 0 | 0 |
| EASTOFLEX E1200 (4% wgt.) | 335 | 0 |

The data in Table 17 indicates that a propylene polymer having a viscosity greater than that of the present propylene polymer, even though containing a high level of comonomer (ethylene), produces no elongated cling when used in blown LLDPE film at a level of about 4% by weight. When compared to the Sample 1D results of Example 5, it is apparent that the film produced from the composition of the present invention, containing the very low viscosity polypropylene homopolymer, has unexpectedly high elongated peel cling.

Example 7

This example illustrates the effect on peel cling values of compositions of the present invention, when measured at periods of 2 and 4 weeks after the films have been produced.

Several propylene polymers were evaluated in monolayer blown film produced from an LLDPE ethylene-hexene copolymer. The hexene-LLDPE had a density of about 0.920 g/cm³ and a melt index of about 0.9 g/1 min. The 0.0008 inch (0.020 mm) thick films were made using a blow-up ratio of about 2.4:1 at a rate of about 100 feet/min. (30.5 m/min.). The propylene polymers shown in Table 18, were evaluated at a level of about 4% by weight. EASTOFLEX 1200 amorphous polyolefin and EASTOFLEX P1010 amorphous polyolefin are commercially available from Eastman Chemical Company.

Table 19 contains the peel cling data for films made from the compositions below, measured 2 weeks after the films were produced. Table 20 contains the peel cling data for the same films measured 4 weeks after the films were produced.

TABLE 18

| Propylene Polymer | Visc., mPa.s at 190° C. | Wt. % Ethylene | Needle Pen. dmm |
|---|---|---|---|
| EASTOFLEX E1200 | 20,000 | 15.0 | 35 |
| Sample 7A | 1,500 | 16.9 | 20 |
| EASTOFLEX P1010 | 900 | — | 20 |
| Sample 1D | 203 | — | 24 |

TABLE 19

Two Week Peel Cling

| Propylene Polymer | Unelongated Peel Cling, g/2.54 cm | Elongated Peel Cling, g/2.54 cm |
|---|---|---|
| None | 0 | 0 |
| E1200 | 335 | 0 |
| Sample 7A | 251 | 89 |
| P1010 | 437 | 84 |
| Sample 1D | 277 | 104 |

TABLE 20

Four Week Peel Cling

| Propylene Polymer | Unelongated Peel Cling, g/2.54 cm | Elongated Peel Cling, g/2.54 cm |
|---|---|---|
| None | 0 | 0 |
| E1200 | 402 | 0 |
| Sampe 7A | 429 | 171 |
| P1010 | 401 | 151 |
| Sampe 1D | 369 | 145 |

Most producers of commercial stretch film like to see immediate cling. They do not want to have to wait 4 weeks before the customer can use the product. For this reason, 2 week peel cling data is shown in all examples. This seems to be the maximum acceptable waiting period for cling to develop.

It is of interest to note, however, that the peel cling values appear to increase as the films are allowed to age for a period of 4 weeks, as compared to measurements taken at a 2 week period.

Example 8

This example shows that a propylene polymer of the type described in the present invention provided a higher level of elongated peel cling in LLDPE cast film than comparative propylene polymers that are not within the propylene polymers of the present invention.

The following propylene polymers were evaluated in monolayer cast films produced from LLDPE ethylene-butene copolymer. The butene-LLDPE had a density of about 0.919 g/cm³ and a melt index of about 2.0 g/10 min. The cast films were made using a slot-cast die at about 100 feet/minute (30.5 m/minute). The propylene polymers shown in Table 21, were evaluated in the cast films at a level of about 5% by weight. The properties of the propylene polymers shown in Table 21 are typical properties. The EASTOFLEX polymers are available commercially from Eastman Chemical Company. Table 22 contains the peel cling data for the films, measured 2 weeks after the films were produced.

TABLE 21

| Propylene Polymers | Visc., mPa.s at 190° C. | Wt. % Ethylene | Needle Pen. dmm |
|---|---|---|---|
| EASTOFLEX E1003 | 250 | 18.0 | 140 |
| D-137 | 500 | — | 25 |
| D-117 | 1,800 | 13.0 | 50 |
| EASTOFLEX P1023 | 2,250 | — | 20 |
| EASTOFLEX E1060 | 6,000 | 13.0 | 40 |
| D-138 | 10,000 | — | 15 |
| D-118 | 10,000 | 13.0 | 30 |

TABLE 22

| Propylene Polymers | Unelongated Peel Cling, g/2.54 cm | Elongated Peel Cling, g/2.54 cm |
|---|---|---|
| None | 113 | 73 |
| EASTOFLEX E1003 | 267 | 187 |
| D-137 | 367 | 287 |
| D-117 | 270 | 173 |
| EASTOFLEX P1023 | 413 | 203 |
| EASTOFLEX E1060 | 287 | 247 |
| D-138 | 290 | 193 |
| D-118 | 340 | 207 |

The data in Table 22 show that the cast film produced using the propylene polymer, D-137, a polymer of the present invention, was characterized by a level of elongated peel cling unexpectedly higher than that of the comparative cast films produced using other propylene polymers, none of which are polymers of the present invention.

Example 9

This example will show that film properties other than peel cling can be improved by adding low viscosity polypropylene homopolymer to an LLDPE film composition.

The polyproplyene homopolymer of Sample 3A, shown in Table 3, having a melt viscosity of 212 mPa.s and a needle penetration of approximately 24 dmm, was evaluated in a multi-layer blown film produced from an LLDPE ethylene-hexene copolymer. The hexene-LLDPE skin layer had a density of about 0.906 g/cm³ and a melt index of about 0.5 g/10 min. The 0.001 inch (0.025 mm) thick films were made with a blow-up ratio of about 2.4:1 at about 60 feet/minute (18.3 mlminute). The film structures were A/B/A with the core layer (B layer) comprising 80% by weight of the entire structure. The core layer in all film samples was a 0.9 g/10 min. melt index, 0.920 g/cm³ density ethylene-hexene copolymer. The outside (skin) layers (A layers) were each 10% by weight of the film structure and were made from ethylene-hexene copolymers. The sample 3A propylene polymer was utilized at a level of 8% by weight in the outside skin film layers.

Table 23 shows, when compared to neat LLDPE, that the composition of the present invention provides a film having improved haze, gloss, dart impact strength, elongation, and puncture strength.

TABLE 23

Hexene-LLDPE Film Properties Containing 8% Sample 3A in Skin Layers

| Film Property | No Sample 3A Polypropylene | 8% Sample 3A in Skin Layers |
|---|---|---|
| Haze, % | 15.9 | 7.1 |
| Gloss, % | 58.8 | 65.0 |
| Dart Impact, g | 211 | 244 |
| Machine Direction Elongation, % | 755 | 785 |
| Puncture Penetration, cm | 11.4 | 13.0 |

Example 10

This example will show the benefits of using a low viscosity polypropylene homopolymer of the present invention with linear ultra low density polyethylene (LULDPE). This example will show that several film properties in addition to peel cling were improved by adding propylene polymers of the present invention to the LULDPE. The LULDPE materials in this example range in density from about 0.906 g/cm$^3$ to about 0.910 g/cm$^3$ and in melt index from about 0.5 g/10 min. to about 2.0 g/10 min. Products with densities of less than 0.916 g/cm$^3$ are considered herein LULDPE products.

Eastman Chemical Company's EASTOFLEX E1003 propylene-ethylene copolymer, not within the present invention, and sample 10A and 10B propylene polymers both within the present invention were evaluated in monolayer blown film produced from LULDPE ethylene-hexene copolymers. The 0.0009 inch (0.023 mm) thick films were made with a blow-up ratio of about 2.4:1 at about 88 feet/minute (26.8 m/minute). The propylene homopolymer properties are shown in Table 24. The EASTOFLEX E1003 properties shown in Table 24 are typical properties. The film properties are shown in Tables 25 and 26.

TABLE 24

| Propylene Polymer | Visc., mPa.s at 190° C. | Wt. % Ethylene | Needle Pen. dmm |
|---|---|---|---|
| Sample 10A | 187 | — | approximately 24 |
| Sample 10B | 180 | — | approximately 24 |
| EASTOFLEX E1003 | 250 | 18.0 | 100 |

TABLE 25

0.9 MI, 0.910 Density LULDPE Film Properties

| Film Property | No Propylene Polymer | 2% EASTOFLEX E1003 | 2% Sample 10B |
|---|---|---|---|
| Unelongated Peel Cling, g/2.54 cm | 216 | 278 | 315 |
| Elongated Peel Cling, g/2.54 cm | 0 | 102 | 225 |

TABLE 25-continued 0.9 MI, 0.910 Density LULDPE Film Properties

| Film Property | No Propylene Polymer | 2% EASTOFLEX E1003 | 2% Sample 10B |
|---|---|---|---|
| Haze, % | 5.2 | 4.4 | 3.6 |
| Gloss, % | 67.4 | 73.4 | 75.9 |
| Dart Impact, g | 882 | >2,000 | 1760 |
| Machine Direction Elongation, % | 660 | 655 | 705 |
| Puncture Penetration, cm | 11.6 | 12.7 | 12.2 |

TABLE 26

2.0 MI, 0.910 Density LULDPE Film Properties

| Film Property | No Propylene Polymer | 2% Sample 10A |
|---|---|---|
| Unelongated Peel Cling, g/2.54 cm | 161 | 328 |
| Elongated Peel Cling, g/2.54 cm | 0 | 147 |
| Haze, % | 8.3 | 6.1 |
| Gloss, % | 65.9 | 68.2 |
| Dart Impact, g | 386 | 426 |
| Machine Direction Elongation, % | 590 | 720 |
| Puncture Penetration, cm | 11.7 | 13.3 |

The data in Tables 25 and 26 indicate that incorporation of 2% by weight of Sample 10A and 10B propylene homopolymers in LULDPE provide films having unexpectedly higher levels of elongated peel cling than films containing EASTOFLEX E1003 or no propylene polymer, measured 2 weeks after the films were made. The films show improved optical properties, dart impact, MD elongation, and puncture resistance.

Example 11

This example shows that when incorporating propylene polymers of the present invention into LLDPE films having densities higher than that of LULDPE, greater amounts of propylene polymer are required to achieve films having a comparable level of peel cling. For comparative purposes, the previous Example 10 describes the results obtained on films produced from LULDPE. In this example, the results were obtained on films produced from propylene polymers of the present invention and LLDPEs having densities from about 0.918 g/cm$^3$ to about 0.920 g/cm$^3$, and having a melt index of about 0.9 g/10 min. As defined herein, LLDPE is intended to include polymeric products having densities of about 0.916 g/cm$^3$ to about 0.940 g/cm$^3$.

Propylene polymer samples 3A and 10B shown in Tables 27 and within the present invention, were evaluated in monolayer blown films produced from an LLDPE ethylene-hexene copolymer. The 0.0009 inch (0.023 mm) thick films were made with a blow-up ratio of about 2.4:1 at about 88 feet/minute (26.8 m/minute). Films produced from LLDPE containing samples 3A and 10B did not show equivalent elongated peel cling when added at 2% by weight as compared to films from LULDPE containing similar samples 10A and 10B. It was found that samples 3A and 10B needed to be added at levels of about 4% by weight to obtain comparable elongated peel cling values. Properties of propylene polymer samples 3A and 10B are shown in Table 27, and film properties are shown Tables 28 and 29.

TABLE 27

| Propylene Polymer | Visc., mPa.s at 190° C. | Needle Pen. dmm |
|---|---|---|
| 3A | 212 | approximately 24 |
| 10B | 180 | approximately 24 |

TABLE 28

0.9 MI, 0.918 Density LLDPE Film Properties

| Film Property | No Propylene Polymer | 2% Sample 3A | 4% Sample 3A |
|---|---|---|---|
| Unelongated Peel Cling, g/2.54 cm | 0 | 272 | 544 |
| Elongated Peel Cling, g/2.54 cm | 0 | 59 | 211 |
| Haze, % | 7.2 | 5.4 | 5.0 |
| Gloss, % | 67.2 | 72.5 | 71.4 |
| Machine Direction Elongation, % | 645 | 825 | 670 |
| Puncture Penetration, cm | 9.9 | 12.1 | 12.1 |

TABLE 29

0.9 MI, 0.920 Density LLDPE Film Properties

| Film Property | No Propylene Polymer | 2% Sample 10B | 4% Sample 10B |
|---|---|---|---|
| Unelongated Peel Cling, g/2.54 cm | 0 | 211 | 291 |
| Elongated Peel Cling, g/2.54 cm | 0 | 43 | 141 |
| Haze, % | 6.7 | 5.8 | 5.4 |
| Gloss, % | 68.5 | 71.2 | 70.5 |
| Puncture Penetration, cm | 10.3 | 10.8 | 11.6 |

From the data in Tables 28 and 29, as also in Examples 9 and 10, the addition of propylene polymers to LLDPEs and LULDPEs consistently increased peel cling, improved optical properties (reduced haze and increased gloss), and increased puncture resistance.

Example 12

Normal turntable type stretch wrap machines unwind film rolls at relatively low speeds. The unwind speed of a roll of stretch film on a Lantech LAN-WRAPPER was measured at about 42 rpm (about 20 m/min.). It is estimated that high speed "arm" stretch wrap machines operate at about twice this speed (about 40 m/min). This example will show the unexpected benefit of low noise blown hexene-LULDPE stretch film containing the propylene polymer sample 10B. The properties of propylene polymer 10B are shown in Table 25 and characterized as having a viscosity at 190° C. of 180 mPa.s and an estimated needle hardness of about 24 dmm. Propylene polymer 10B was added to two LULDPE products ranging in density from about 0.906 g/cm³ to about 0.910 g/cm³ and in melt index from about 0.5 g/10 min. to about 0.9 g/10 min. This was compared to skin layers of neat LULDPE. All films in this example contained a hexene-LLDPE core layer having a density of about 0.920 g/cm³ and a melt index of about 0.9 g/10 min. The 0.001 inch (0.025 mm) thick films were made with a blow-up ratio of about 2.4:1 at about 60 feet/minute (18.3 m/minute). The film structures were A/B/A with the core layer (B Layer) being 80% by weight of the entire structure. Each of the skin layers (A Layers) is about 10% by weight of the film structure (about 20% by weight total).

The unwinding noise and peel cling values of films containing about 8% by weight propylene polymer Sample 10B in the skin layers of a three-layer blown film were compared to skin layers of a LULDPE containing no cling additive and the data are shown in Tables 30 and 31. Noise data was measured by a decibel meter and maximum noise levels were recorded. The film roll unwinding speed was measured at about 60 rpm (about 41 m/min). The equipment used to unwind the film was measured as having a maximum noise level of 71 decibels (dB) when running without film on the rollers.

TABLE 30

0.5 MI, 0.906 Density LULDPE Skin Layer Films

| Film Property | LULDPE Skins No Polypropylene | 8% Polypropylene 10B in LULDPE Skins |
|---|---|---|
| Unelongated Peel Cling, g/2.54 cm | 0 | 445 |
| Elongated Peel Cling, g/2.54 cm | 0 | 187 |
| Max. Unwinding Noise, dB | 84 | 79 |

TABLE 31

0.9 MI, 0.910 Density LULDPE Skin Layer Films

| Film Property | LULDPE Skins No Polypropylene | 8% Polypropylene 10B in LULDPE Skins |
|---|---|---|
| Unelongated Peel Cling, g/2.54 cm | 172 | 745 |
| Elongated Peel Cling, g/2.54 cm | 0 | 153 |
| Max. Unwinding Noise, dB | 78 | 77 |

In Tables 30 and 31, the peel cling values were measured 2 weeks after the films were produced. The data show that the films produced from compositions of LULDPE containing propylene polymer of the present invention had higher peel cling values than those obtained on films produced from neat LULDPE. Moreover, as the data show, the films produced from the propylene polymer-containing LULDPE were characterized as having lower unwinding noise level at high unwinding speeds than films produced from neat LULDPE. This is completely unexpected since it is generally known that films containing peel cling additives are generally characterized by having increased noise levels.

It should be clearly understood that the forms of the invention herein described are illustrative only and are not intended to limit the scope of the invention. The present invention includes all modifications falling within the scope of the following claims.

I claim:

1. A composition comprising:
    (a) from about 85 to about 99 weight percent based on the total weight of the composition of a component selected from the group consisting of a homopolymer of ethylene, an ethylene alpha olefin copolymer, an ethylene vinyl acetate copolymer, and mixtures thereof, wherein the component has a density no greater than 0.94 g/cc; and (b) from about 1 to about 15 weight percent, based on the total weight of the composition, of a propylene polymer comprising 0 to less than about 1 weight percent based on the polymer, of an olefin comonomer unit having 2 to 10 carbon atoms, and from about greater than 99 to 100 weight percent propylene based on the polymer, wherein the propylene polymer has a Brookfield Thermosel viscosity of about 1 to about 2,000 mPa.s at 190° C. and a needle penetration of about 5 to 50 dmm, determined according to ASTM, at 23° C.

2. The composition according to claim 1 wherein the component has a density of from about 0.88 to about 0.94 g/cc.

3. The composition according to claim 1 wherein the component is an ethylene alpha olefin copolymer wherein the alpha olefin comonomer has from 3 to 20 carbon atoms and is present in an amount of from about 2 to about 20 weight percent based on the ethylene alpha olefin copolymer.

4. The composition according to claim 3 wherein the alpha-olefin comonomer is selected from the group consisting of 1-butene, 1-hexene and 1-octene.

5. The composition according to claim 1 wherein the propylene polymer has at least 1 weight percent crystallinity, as determined by a hexane extraction method.

6. The composition according to claim 1 wherein the alpha olefin comonomer units of the propylene polymer are ethylene units.

7. The composition according to claim 1 wherein the propylene polymer contains 0 to less than about 0.5 weight percent olefin comonomer units.

8. The composition according to claim 1 wherein the propylene polymer is polypropylene homopolymer.

9. The composition according to claim 1 wherein the propylene polymer has a Brookfield Thermosel viscosity of from about 1 to about 1500 mPa.s at 190° C.

10. The composition according to claim 9 wherein the propylene polymer has a Brookfield Thermosel viscosity of from about 1 to about 800 mPa.s at 190° C.

11. The composition according to claim 1 wherein the propylene polymer has a needle penetration of about 5 to about 40 dmm, at 23° C.

12. The composition according to claim 11 wherein the propylene polymer has a needle penetration of about 5 to about 30 dmm, at 23° C.

13. The composition according to claim 1 wherein the component is present in an amount of about 90 to about 99 weight percent and the propylene polymer is present in an amount of about 1 to about 10 weight percent.

14. A film formed from the composition according to claim 1.

15. The film according to claim 14 further having a peel cling strength of about 100 g/2.54 cm to about 500 g/2.54 cm, determined according to ASTM D5458-95.

16. The film according to claim 14 wherein the film is a blown film.

17. The film according to claim 14 wherein the film is a cast film.

18. The film according to claim 14 wherein the film is a stretch wrap film.

19. The film according to claim 14 wherein the film is a blown stretch wrap film.

20. The film according to claim 14 wherein the film is a monolayer film.

21. A multilayer film wherein at least one of the layers of the multilayer film comprises the film according to claim 14.

22. An article of manufacture comprising the film according to claim 14.

* * * * *